April 12, 1960
E. A. ROCKWELL
2,932,168
MASTER CYLINDER CONSTRUCTION
Filed July 2, 1954
4 Sheets-Sheet 2
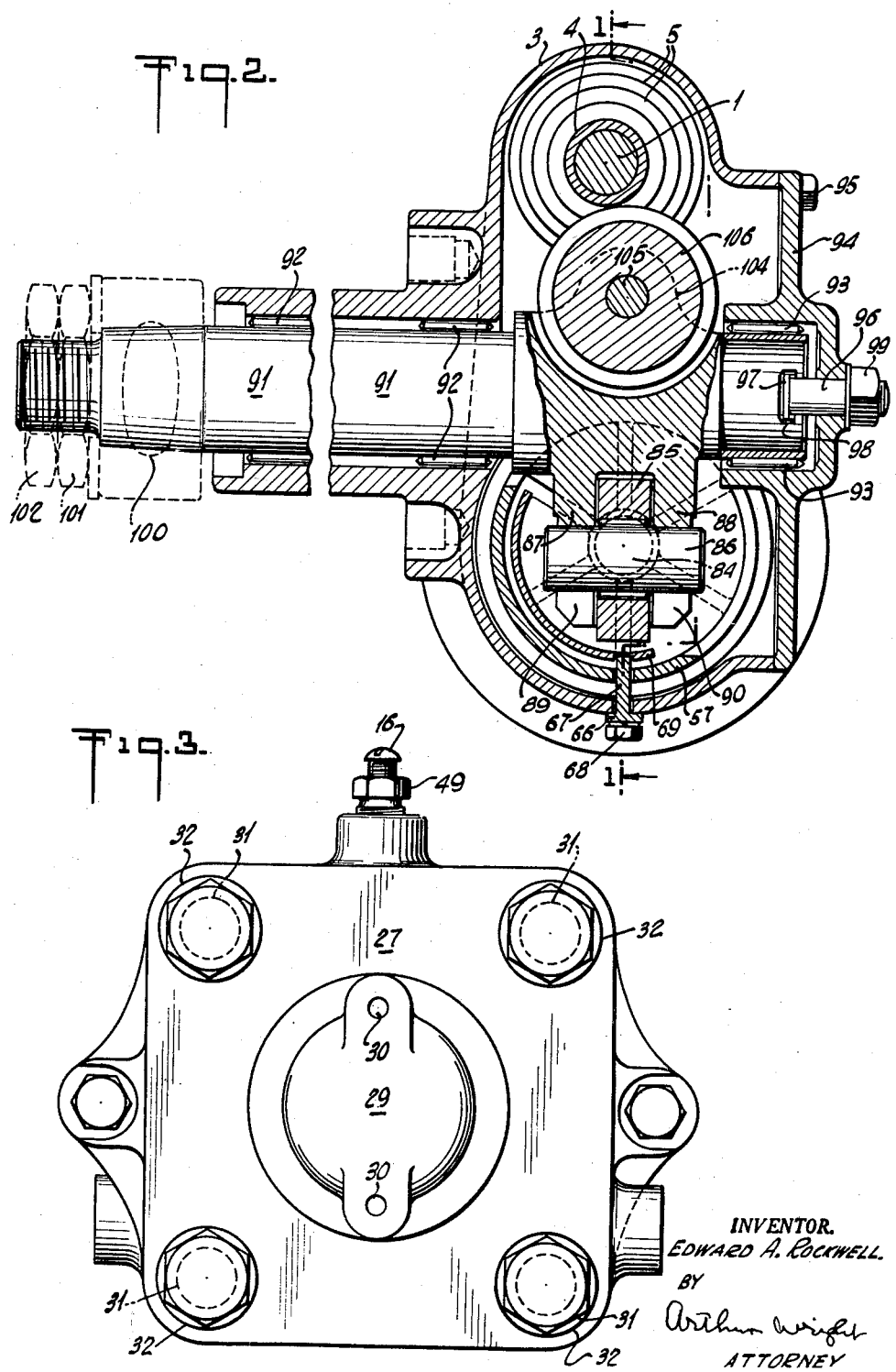
INVENTOR.
EDWARD A. ROCKWELL.
BY
Arthur Wright
ATTORNEY INVENTOR.
EDWARD A. ROCKWELL.
BY
Arthur Wright
ATTORNEY INVENTOR
EDWARD A. ROCKWELL.
BY
Arthur Wright
ATTORNEY United States Patent Office 2,932,168
Patented Apr. 12, 1960

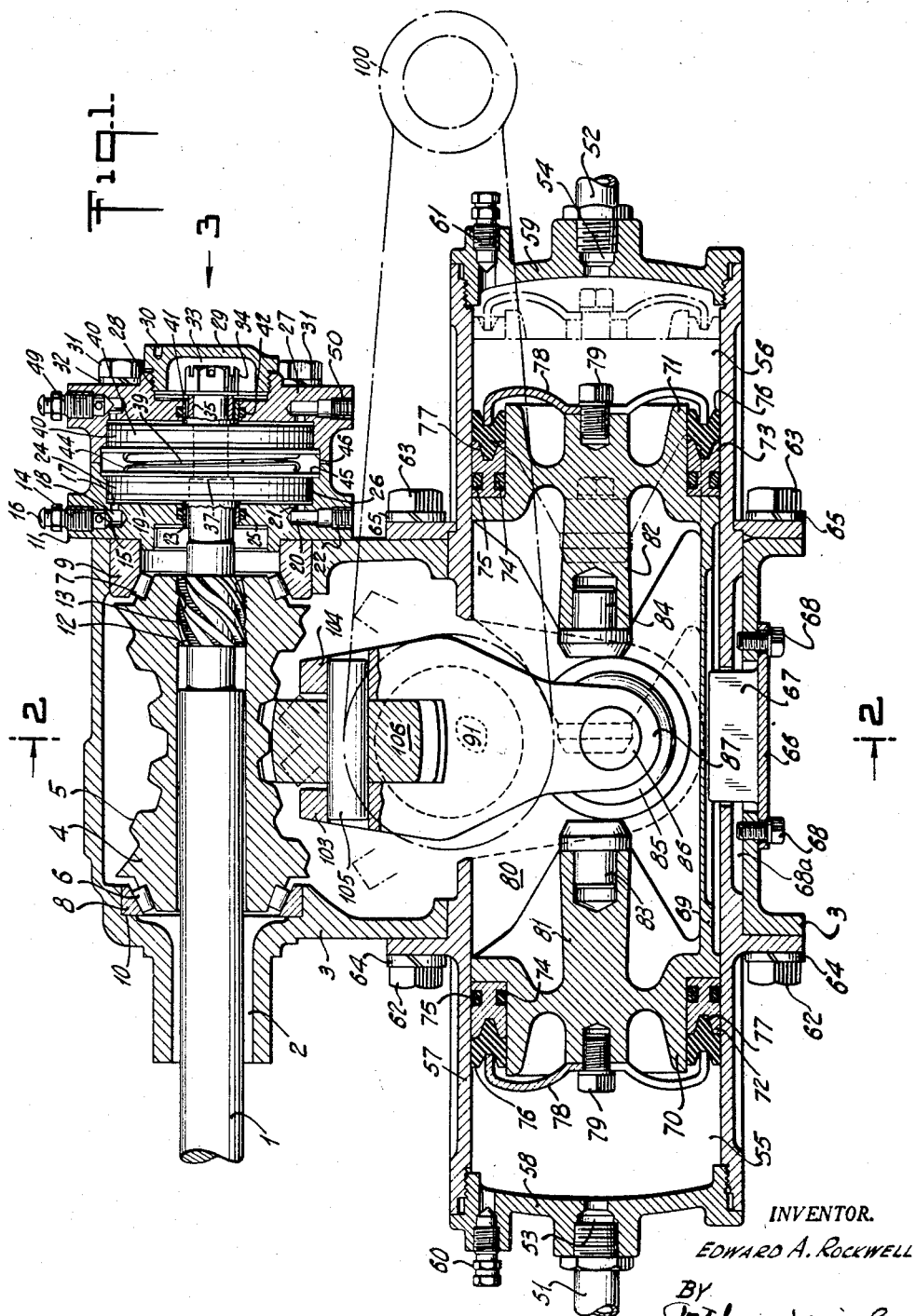

2,932,168
MASTER CYLINDER CONSTRUCTION
Edward A. Rockwell, Los Angeles, Calif.
Application July 2, 1954, Serial No. 440,994
8 Claims. (Cl. 60—54.6)

My invention relates particularly to pressure fluid control means, and more particularly to master cylinder constructions which may be applied to the operation or movement of any desired apparatus hydraulically, for example, power steering apparatus.

It is a principal object of my invention to provide pressure fluid control means having an improved centering mechanism, and particularly steering devices of any desired type, as for instance in the power steering of automotive vehicles. My invention has particular application for the control of power steering mechanism, for instance as disclosed in detail in my copending application upon Power Steering Unit, executed May 10, 1946, Ser. No. 440,999, filed July 2, 1954, now Patent No. 2,896,463, and which is arranged particularly for use in connection with the system as shown in my copending application upon Power Steering System, executed August 26, 1946, Ser. No. 440,993, filed July 2, 1954, now Patent No. 2,896,733. A further more specific object is to provide an improved cylinder including a pair of opposed pistons provided with a centering mechanism tending to restore them to a central or neutral position while being yieldably movable in either direction from said central position. Another object is to mount the piston or pistons in such a manner that the operating rod or steering column for the same is freely rotatable therein while at the same time being connected to be movable longitudinally together with the said piston or pistons. Still another object is to mount the master cylinder and rod for the steering column contained therein so that the pistons therein may be readily removable from the end of the steering column, but, nevertheless, so as to be effectively sealed within the same. Still another object is to mount the master cylinder in this way so as to have an effective centering of the steering rod or column. Further objects of my invention will appear from the detailed description of the same hereinafter.

While my invention may be carried out in many different ways, for the purpose of illustration I have shown only one embodiment thereof in the accompanying drawings, in which—

Fig. 1 is a vertical sectional view showing the steering unit operated from the steering column, taken approximately on line 1—1 of Fig. 2;

Fig. 2 is a horizontal section of the same, taken approximately on line 2—2 of Fig. 1;

Fig. 3 is an enlarged elevation of a cap or plate cover for covering the lower end of the steering column of Fig. 1 and looking in the direction of the arrow 3;

Figure 4:
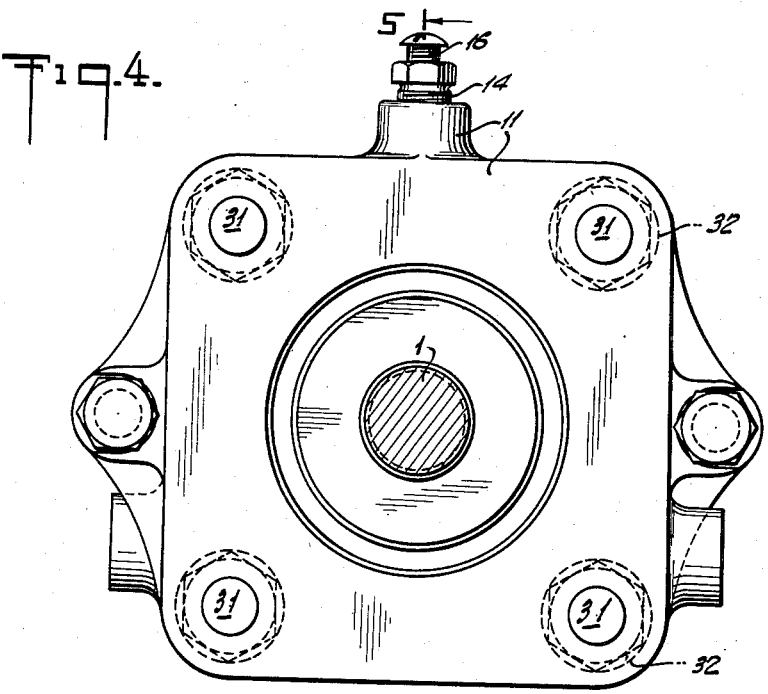
Fig. 4 is a horizontal section at the same scale showing an end plate for guiding the end of the steering column, looking in the direction of arrow 4 of Fig. 5.

In the drawings, for purpose of illustrating the present invention I have shown a power steering control means herein shown as a master cylinder unit connected to apply manual pressure liquid to a pair of hydraulic valves which are alternately operable to admit and discharge hydraulic pressure liquid to one or the other of a pair of power piston cylinders associated with the steering column in such a manner that when the steering column is moved in one direction or the other hydraulic pressure liquid will be applied to one or the other of the power pistons to effectuate the power steering. The power steering system is disclosed in my Patents Nos. 2,896,463 and 2,896,733 hereinbefore mentioned, to which reference may be made for further details of the system.

Figure 5:
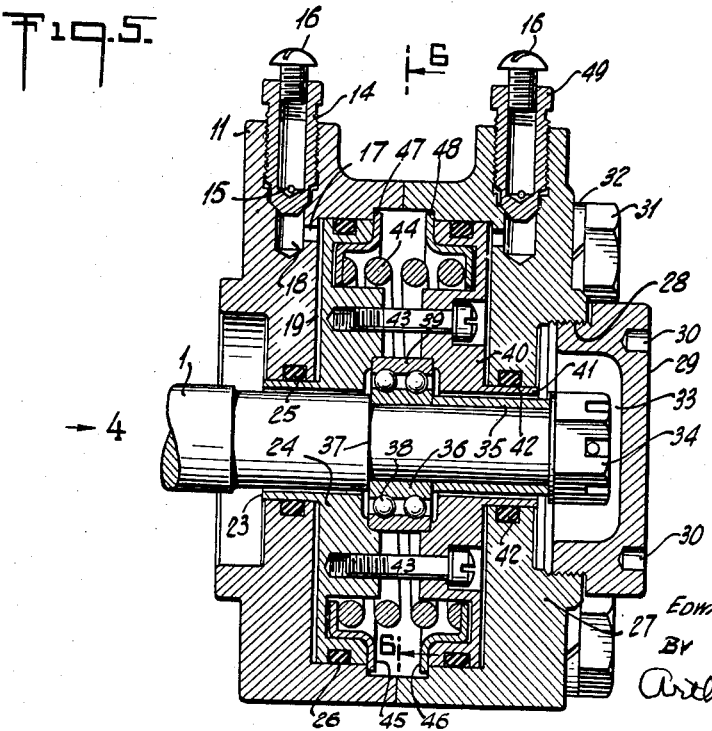
Fig. 5 is a cross-sectional view of the hydraulic unit attached to the steering column, taken on line 5—5 of Fig. 4.
Figure 6:
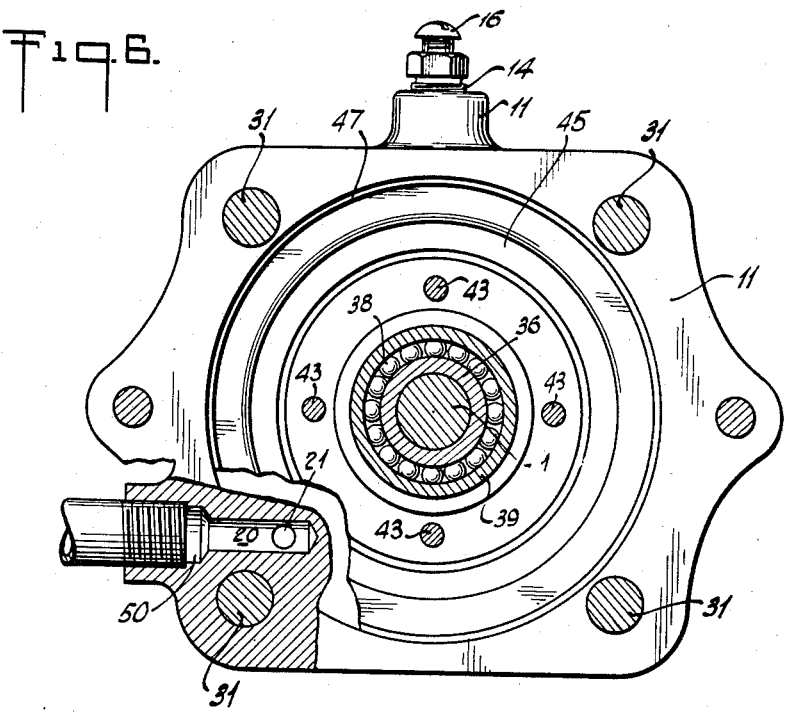
Fig. 6 is a horizontal section of the same taken on line 6—6 of Fig. 5.
Figure 7:
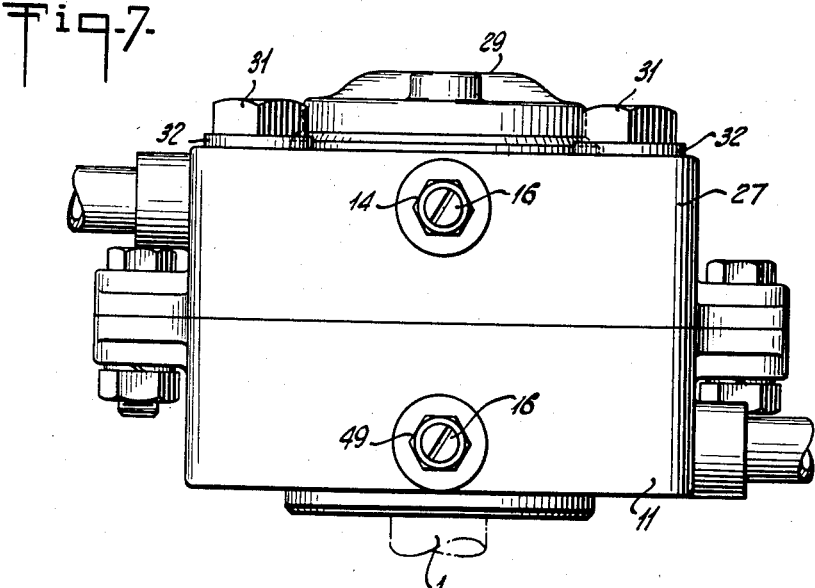
Fig. 7 is a plan view of the same.

Accordingly, in the drawings, I have shown a steering column 1 which passes downwardly into an opening 2 in a worm housing 3 having a worm 4 in which the steering column 1 is movable. The worm 4 has spiral teeth 5 on its periphery and is rotatably supported on roller bearings 6 and 7 carried in races 8 and 9, respectively. The race 8 is carried in a recess 10 in the worm housing 3 and the race 9 is supported upon a master cylinder plate 11. In the interior of the worm 4 there is an internal worm gear 12 arranged to mesh with an external worm gear 13 on the steering column 1. Beyond the worm gear 13 the steering column 1 passes through the master cylinder plate 11 which has on its outer periphery an air bleeder screw 14 with a small transverse aperture 15 normally closed by an internal screw 16 which may be removed, when desired, to permit the escape of accumulated air. A longitudinal port 17 leads from a small chamber 18 in which the air bleeder is carried, to an annular master cylinder chamber 19 in the master cylinder plate 11. On the other side of the plate 11 there is a similar chamber 20 having a passageway 21 connected to the master cylinder chamber 19. This chamber 20 provides an outlet port 22 for connection with one of the pair of hydraulic pressure liquid valves above referred to (not shown) or any other suitable hydraulic valve. Passing through the master cylinder plate 11, furthermore, there is a sleeve 23 forming a portion of an annular master cylinder piston 24 provided with an annular seal 25 of rubber or rubber substitute. This master cylinder piston 24 also has an annular seal 26 of rubber or rubber substitute. Adjacent to the master cylinder plate 11 there is an outer master cylinder plate 27 substantially like the plate 11 except that it has an internal screw-thread 28 to receive a screw cap 29 having spanner holes 30. The plates 11 and 27 are secured together by a plurality of screws 31 having lock washers 32. The said screw cap 29 has, also, therein a chamber 33 to receive a nut 34 which is located on the screw-threaded outer end of the steering column. The nut 34 holds in place a sleeve 35 against an inner ball race 36 which fits against a shoulder 37 so as to support ball bearings 38 having a bearing ring 39 clamped in place between the master cylinder piston 24 and a similar master cylinder piston 40 which, likewise, has a sleeve 41 like the sleeve 23 and an annular seal 42 like the seal 25. The master cylinder pistons 24 and 40 are clamped together by means of screws 43, thus holding the race 36 and the ring 39 in fixed position. In accordance with one of the primary aspects of this invention, the pressure fluid control means herein shown as a master cylinder unit with pistons 24, 40 is brought back to middle position by a centering mechanism between the pistons. To this end, as shown in Fig. 5 the centering mechanism includes a helical compression spring 44 between spring retainer rings 45 and 46 with outer edges 47 and 48 in a peripheral groove in the outer wall of the chamber 19 defined between the master cylinder plates 11 and 27, respectively. The master cylinder plate 27 also has an air bleeder screw 49, like the bleeder screw 14, and an outlet port 50, like the outlet port 22, which leads to the other one of the pair of valves controlling the admission of the high pressure of the hydraulic pressure liquid for the operation of the power steering column.

The hydraulic pressure liquid thus caused to flow into the steering power unit, by reason of the delivery of the manual pressure liquid from one of the ports 22 and 50 and the withdrawal of the manual pressure liquid through the other one of said ports, will thus be conducted by a pipe 51 or a pipe 52 through one or the other of two inlet ports 53 and 54, to one or the other of two power cylinders 55 and 56, it being understood that as high pressure liquid is admitted to the cylinder 55 the liquid will be discharged or released from the other of said power cylinders, and vice versa. The power cylinders 55 and 56 are located in a cylindrical casing 57 having on the two ends thereof cylinder heads 58 and 59 which are provided, respectively, with air bleeders 60 and 61. This casing 57 is secured by means of screws 62 and 63 and lock washers 64 and 65 to the worm housing 3. Also, it will be noted that the cylindrical casing 57 has an opening which is closed by a cover plate 66 having a piston guide 67 thereon secured in place by screws 68, which register with grooves 68a in the casing 57. Within the cylindrical casing 57, furthermore, there is a double piston member 69 having on the end thereof pistons 70 and 71 which carry around the peripheries thereof piston rings 72 and 73, which are preferably made of aluminum so as to spread slightly, as well as inner and outer seals 74 and 75, also terminal annular seals 76, which are held in place in recesses 77 in the piston rings 72 and 73, each terminal seal 76 being fixedly secured by means of a seal-retaining plate 78 and a screw 79. The seals 74, 75 and 76 may be of rubber or any rubber substitute, as for instance neoprene. Between the pistons 70 and 71 there is located a central chamber 80 into which there are arranged to project from the pistons 70 and 71, bosses 81 and 82 carrying therein wear buttons 83 and 84 which ride upon a wear wheel 85 carried on pivots 86 in arms 87 and 88 having slots 89 and 90 for this purpose, respectively. The arms 87 and 88 are carried upon a horizontal shaft 91 having a roller bearing 92 in the worm housing 3 and a roller bearing 93 in a cover plate 94 secured to the worm housing 3 in any desired manner, as for instance by screws 95. A guide rod 96, having a head 97, may be provided to fit in a slot 98 in the end of the shaft 91, a nut 99 being located thereon to hold the guide rod 96 in position. On the opposite end of the shaft 91 there is keyed a steering arm 100 which is held in place by means of nuts 101 and 102 screw-threaded to the end of the shaft 91. The shaft 91, furthermore, has, opposite to the arms 87 and 88, a pair of arms 103 and 104 which has a transverse pivot pin 105 between the same, provided with a grooved wheel 106 which meshes with the worm wheel 4 so that by the turning of the worm wheel 4 to steer the automobile, and by the movement of one or the other of the pistons 70 and 71, the arms 87, 88, 103 and 104 are rotated on the shaft 91 so as to move the steering arm 100 which is pivotally connected to the steering linkage of the automobile, as for instance the linkage usually carried by the front wheels thereof.

In the operation of my power steering unit, when the steering wheel (not shown) attached to the column 2 is rotated for the steering of the automobile, this will turn the worm gear 13 on the steering column 1 so as to rotate the worm wheel 4 to simultaneously move the master cylinder pistons 24 and 40 in one direction or the other so as to expel liquid under manual pressure out through one or the other of the ports 22 and 50 to operate the valve mechanism, and so as, thereby, to admit, simultaneously, high pressure liquid to one of the inlet ports 53 and 54 while releasing the liquid from the other one of said ports. Thus, by the meshing of the grooved wheel 106 with the worm wheel 4 and by the inward movement of one or the other of the power pistons 70 and 71 under the influence of the high pressure liquid admitted, the arms 87, 88, 103 and 104 will be rotated on the shaft 91 so as to move the axes of the front wheels of the automobile in the usual manner. It will be understood that this rotary movement of the steering column 1 will move the master cylinder piston 24 and 40 against the opposition of the helical spring 44 carried between the spring-retaining rings 45 and 46. When the manually rotated steering column 1 is being released the master cylinder pistons 24 and 40 will, furthermore, be returned to their central position by means of the said helical spring 44 and the spring-retaining rings 45 and 46, this being accomplished by the reverse flow of the hydraulic pressure liquids in the two power cylinders 55 and 56. Of course, the automobile may be steered in the opposite direction by the opposite rotation of the steering column 1 and the coordinate flow or release, respectively, of the high pressure hydraulic liquid to or from the power cylinders 55 and 56. In the movement of the pistons 70 and 71 in the cylindrical casing 57, the reciprocation thereof is guided by means of the guide 67 and said guide 67 is retained fixedly in its appropriate position by means of the screws 68 which register with the recesses 68a in the casing 57.

While I have described my invention above in detail I wish it to be understood that many changes may be made therein without departing from the spirit of the same.

I claim:

1. A master cylinder for a hydraulic system comprising, a casing, a pair of opposed pistons connected together and slidably mounted for movement in either direction from a central position in said casing, means in said casing forming hydraulic chambers including said pistons, each of said chambers having an outlet communicating with hydraulic lines connected in said system, an actuating member connected to the pistons to move the latter from said central position, and a centering mechanism for returning said pistons to said central position including a compression spring acting at opposite ends on said opposed pistons and arranged to be operatively engaged at one end by one of said pistons tending to compress the spring upon movement of the actuating member in either direction, and abutment means operatively engaged by the other end of the spring and against which the spring is compressed in either direction of movement of the actuating member.

2. A master cylinder for a hydraulic system comprising, a casing, a pair of opposed pistons connected together and slidably mounted for movement in either direction from a central position in said casing, means in said casing forming hydraulic chambers including said pistons, each of said chambers having an outlet communicating with hydraulic lines connected in said system, an actuating member connected to the pistons to move the latter from said central position, and a centering mechanism for returning said pistons to said central position including a resilient member acting at opposite ends on said pistons and arranged to be operatively engaged at one end by one of said pistons tending to stress said resilient member upon movement of the actuating member in either direction, and abutment means against which the other end of said resilient member is anchored in either direction of movement of the actuating member.

3. In a power steering system having a manually operated steering shaft, a pressure fluid source and control means for controlling the application of pressure fluid from said source including an actuating member connected to said manually operated steering shaft for longitudinal movement in either direction from a central position upon movement of said steering shaft, the improvement which comprises a centering mechanism for said longitudinally movable actuating member, a casing for said centering mechanism defining an annual chamber around said actuating member, a pair of longitudinally disposed elements connected together in said chamber radially of said actuating member and carried by the latter for longitudinal movement therewith in either direction from a central position, means mounting said actuating member for rotational movement about its axis relative to said elements, a pair of mutually opposed retainer rings movably carried in said chamber around said actuating member and between said elements, and a compression spring between said retainer rings for urging the latter mutually apart and toward engagement with said elements respectively, one of said retainer rings being movable by one of said elements tending to compress said spring upon movement of said actuating member in either direction, said casing defining a recess in the outer wall of said chamber between said elements and into which the outer edges of said retainer rings extend, the ends of said recess providing abutments limiting longitudinal movement of said rings and against which the other one of said retainer rings bears to compress said spring in either direction of movement of said actuating member.

4. A master cylinder for a hydraulic system comprising, a casing, a pair of opposed pistons connected together and slidably mounted for movement axially in either direction from a central position in said casing, means in said casing forming axially arranged hydraulic chambers, one of said chambers including each of said pistons, an actuating member connected to the pistons to move the latter from said central position, means for mounting said actuating member for rotational and axial movement in said casing, and a centering mechanism for returning said pistons to said central position including a compression spring acting at opposite ends on said opposed pistons and arranged to be operatively engaged at one end by one of said pistons tending to compress the spring upon movement of the actuating member in either direction, and abutment means operatively engaged by the other end of the spring and against which the spring is compressed in either direction of movement of the actuating member.

5. A master cylinder for a hydraulic system comprising, a casing, a pair of opposed pistons connected together and slidably mounted for movement axially in either direction from a central position in said casing, means in said casing forming axially arranged hydraulic chambers, one of said chambers including each of said pistons, an actuating member, means connecting said actuating member to move said pistons axially from said central position including a bearing affording relative rotational movement of said actuating member, and a centering mechanism for returning said pistons to said central position including a compression spring acting at opposite ends on said opposed pistons and arranged to be operatively engaged at one end by one of said pistons tending to compress the spring upon movement of the actuating member in either direction, and abutment means operatively engaged by the other end of the spring and against which the spring is compressed in either direction of movement of the actuating member.

6. A master cylinder for a hydraulic system comprising, a casing defining axially arranged hydraulic cylinders each having a side wall and an end wall, a pair of opposed pistons connected together and mounted for movement axially in either direction from a central position in said casing wherein said pistons are in sliding engagement with the side walls of said cylinders respectively, tubular extensions on the outer faces of said pistons slidably received in and projecting outwardly through the end walls of said cylinders, said end walls, side walls and tubular extensions defining hydraulic chambers including said pistons, and a centering mechanism for returning said pistons to said central position including a compression spring acting at opposite ends on said opposed pistons and arranged to be operatively engaged at one end by one of said pistons tending to compress the spring upon movement of the actuating member in either direction, and abutment means operatively engaged by the other end of the spring and against which the spring is compressed in either direction of movement of the actuating member.

7. A master cylinder for a hydraulic system comprising, a casing defining axially arranged hydraulic cylinders each having a side wall and an end wall, a pair of longitudinally spaced pistons connected together and mounted for movement axially in either direction from a central position in said casing wherein said pistons are in sliding engagement with the side walls of said cylinders respectively, tubular extensions on the outer faces of said pistons slidably received in and projecting outwardly through the end walls of said cylinders, said end walls, side walls and tubular extensions defining hydraulic chambers including said pistons, and a centering mechanism for returning said pistons to said central position including a compression spring between said pistons, a pair of movable retainer rings receiving the opposite ends of said spring, one of said rings being arranged to be moved by one of said pistons tending to compress the spring upon movement of the actuating member in either direction, and means in said casing defining an annular recess between said pistons and into which the outer edges of the rings extend, the ends of said recess providing abutments limiting axial movement of said rings and against which the other of said rings bears and the spring is compressed in either direction of movement of the actuating member.

8. A master cylinder for a hydraulic system comprising, a casing, a pair of longitudinally spaced pistons connected together and slidably mounted for movement in either direction from a central position in said casing, means in said casing forming hydraulic chambers including said pistons, each of said chambers having an outlet communicating with hydraulic lines connected in said system, an actuating member connected to the pistons to move the latter from said central position, and a centering mechanism for returning said pistons to said central position including a compression spring between said pistons, a pair of movable retainer rings receiving the opposite ends of said spring, one of said rings being arranged to be moved by one of said pistons tending to compress the spring upon movement of the actuating member in either direction, and means in said casing defining an annular recess between said pistons and into which the outer edges of the rings extend, the ends of said recess providing abutments limiting axial movement of said rings and against which the other of said rings bears and the spring is compressed in either direction of movement of the actuating member.

References Cited in the file of this patent

UNITED STATES PATENTS

| | | |
|---|---|---|
| 1,711,450 | Davis | Apr. 30, 1929 |
| 1,999,211 | Sauzedde | Apr. 30, 1935 |
| 2,106,608 | Kelley | Jan. 25, 1938 |
| 2,190,228 | Bowen | Feb. 13, 1940 |
| 2,292,916 | Wheelon | Aug. 11, 1942 |
| 2,305,302 | Mazur | Dec. 15, 1942 |
| 2,360,539 | Ballard | Oct. 17, 1944 |
| 2,612,419 | Reynolds | Sept. 30, 1952 |
| 2,710,596 | Folkerts | June 14, 1955 |
| 2,762,231 | MacDuff | Sept. 11, 1956 |
| 2,809,495 | Ingres | Oct. 15, 1957 |

FOREIGN PATENTS

| | | |
|---|---|---|
| 20,974 | Norway | Jan. 9, 1911 |